(12) United States Patent
Schmidt et al.

(10) Patent No.: US 8,678,971 B2
(45) Date of Patent: Mar. 25, 2014

(54) DRIVE ASSEMBLY (75) Inventors: Mark Schmidt, Koenigswinter (DE);
Michael Schwekutsch, Wermelskirchen (DE); Colin Zaers, Koenigswinter (DE)

(73) Assignee: GKN Driveline International GmbH, Lohmar (DE)

( * ) Notice: Subject to any disclaimer, the term of this patent is extended or adjusted under 35 U.S.C. 154(b) by 217 days.

(21) Appl. No.: 13/140,670

(22) PCT Filed: Dec. 18, 2009

(86) PCT No.: PCT/EP2009/009126
§ 371 (c)(1),
(2), (4) Date: Nov. 17, 2011

(87) PCT Pub. No.: WO2010/078937
PCT Pub. Date: Jul. 15, 2010

(65) Prior Publication Data
US 2012/0053002 A1 Mar. 1, 2012

(30) Foreign Application Priority Data
Dec. 19, 2008 (DE) .................. 10 2008 063 904

(51) Int. Cl.
*F16H 48/22* (2006.01)
(52) U.S. Cl.
USPC .......................................... 475/231
(58) Field of Classification Search
CPC .................................. F16H 48/22
USPC .......................................... 475/231
See application file for complete search history.

(56) References Cited

U.S. PATENT DOCUMENTS

| 4,950,214 | A | | 8/1990 | Botterill |
| 5,092,825 | A | * | 3/1992 | Goscenski et al. ............ 475/150 |
| 5,161,636 | A | | 11/1992 | Haupt et al. |
| 5,423,235 | A | | 6/1995 | Botterill et al. |
| 5,713,446 | A | | 2/1998 | Organek et al. |
| 6,758,782 | B2 | | 7/2004 | Matzschker et al. |
| 6,827,663 | B2 | | 12/2004 | Tucker-Peake |

(Continued)

FOREIGN PATENT DOCUMENTS

| DE | 3815225 A1 | 11/1989 |
| DE | 3913487 A1 | 11/1989 |

(Continued)

OTHER PUBLICATIONS

English Translation of PCT International Search Report for PCT/EP2009/009126 dated Jun. 21, 2011.
PCT International Search Report for PCT/EP2009/009126 dated Jun. 7, 2010.

*Primary Examiner* — Edwin A Young
(74) *Attorney, Agent, or Firm* — Bejin VanOphem & Bieneman PLC (57) ABSTRACT

A drive assembly for a multi-axle driven motor vehicle is disclosed herein. The drive assembly comprises a differential unit having a rotational axis, an input part and two output parts drivably connected to the input part, an externally controllable selectable coupling, and an externally controllable locking coupling. The output parts have a compensating effect among each other. The externally controllable selectable coupling is for drivably connecting the differential unit to a drive source. The externally controllable locking coupling is for locking the compensatory movement between both output parts of the differential unit. The selectable coupling and the locking coupling are arranged coaxially to the rotational axis.

28 Claims, 8 Drawing Sheets

(56) References Cited

U.S. PATENT DOCUMENTS

| | | |
|---|---|---|
| 2002/0049110 A1 | 4/2002 | Ishikawa |
| 2005/0040002 A1 | 2/2005 | Teraoka |
| 2005/0250613 A1* | 11/2005 | Ludwig et al. ................ 475/231 |
| 2006/0046890 A1* | 3/2006 | Aikawa ......................... 475/231 |
| 2006/0052207 A1* | 3/2006 | Teraoka ........................ 475/231 |
| 2009/0203488 A1 | 8/2009 | Hultgren |

FOREIGN PATENT DOCUMENTS

| | | |
|---|---|---|
| DE | 103 04 730 B3 | 10/2004 |
| DE | 102008037885 A1 | 3/2010 |
| EP | 1593540 A2 | 11/2005 |
| JP | 11210863 A | 8/1999 |
| WO | WO-2006/060139 A2 | 6/2006 |

* cited by examiner

DRIVE ASSEMBLY

CROSS REFERENCE TO RELATED APPLICATIONS

This application is a National Phase of International Application No. PCT/EP2009/009126, filed on Dec. 18, 2009, which claims priority to German Application No. 10 2008 063 904.4 filed on Dec. 19, 2008, which applications are hereby incorporated by reference in their entirety.

TECHNICAL FIELD

The disclosure relates to a coupling assembly for connecting a drive axle in a multi-axle driven motor vehicle. Generally, there are two different drive systems: one where a plurality of drive axles of the motor vehicle is permanently driven and one where a first drive axle is driven permanently, with a second drive axle being connected when required. Such drive systems with an optionally connectable drive axle are referred to as hang-on or on-demand systems.

BACKGROUND

From DE 103 11 427 A1 there is known a differential drive with a differential carrier. There is provided a first coupling package for producing a torque-transmitting connection from a drive to the differential carrier. Furthermore, there is provided a second coupling package for blocking a relative rotation between the differential carrier and a sideshaft gear. The first and the second coupling package are actuated via a ball ramp setting drive.

DE 103 04 730 B3 proposes a multi-plate coupling for transmitting torque between a coupling hub and a coupling carrier. Between the coupling hub and the coupling carrier there is arranged a plate package which can be actuated via an axial setting device. The plate package is axially supported on a supporting disc. The supporting disc is connected to the coupling hub in a rotationally fixed way and forms a form-locking connection with the coupling carrier.

From DE 39 13 487 A1 there is known a four-wheel drive tractor whose front axle differential and rear axle differential are permanently driven during off-road applications. In order to prevent any distortions between the front axle and rear axle during cornering, there is provided a coupling between the ring gear of the rear axle differential and the differential carrier. The coupling is ventilated via an actuating cylinder and can thus be controlled under conditions of slip.

From EP 0 466 863 B1 there is known a device for connecting a driveline of a motor vehicle. One of the drivelines is permanently connected to a drive unit and a further driveline is designed to be optionally connectable to the drive unit.

DE 38 15 225 A1 proposes a lockable differential drive. For locking the differential, there is provided a friction coupling which can be actuated by a ball ramp assembly. The ball ramp assembly is driven by an electric motor.

From DE 101 60 026 A1 there is known an actuating mechanism for axial setting purposes for a transfer case of a multi-axle driven motor vehicle. The actuating mechanism comprises a central disc which is rotatable relative to two outer discs. Thus, a locking coupling for the differential drive can be actuated on the one hand and a two-stage gearbox can be switched, on the other.

DE 10 2008 037 885.2-21 proposes a drive assembly with a hang-on coupling and a differential unit for a multi-axle driven motor vehicle. The hang-on coupling is provided in the form of a friction plate coupling which is arranged coaxially relative to the rotational axis of the differential carrier of the differential unit.

SUMMARY

A drive assembly for a multi-axle driven motor vehicle is disclosed which comprises a differential unit with a rotational axis A, one input part and two output parts drivingly connected to the input part. The two output parts have a differential effect relative to one another. An externally controllable hang-on coupling for drivingly connecting the differential unit to a driveshaft is also included, as well as an externally controllable locking coupling for restricting the differential movement between the two output parts of the differential unit. The hang-on coupling and the locking coupling are arranged coaxially relative to the rotational axis A. The drive assembly comprises at least one actuator for actuating the hang-on coupling and the locking coupling, wherein, in one exemplary arrangement, there is provided exactly one single actuator which serves to actuate both the hang-on coupling and the locking coupling.

The disclosed drive assembly is advantageous in that it has two functions, i.e. to optionally drive a secondary driveline and to restrict the compensating movement of the differential unit and in that it comprises a compact design at the same time. Because the hang-on coupling and the locking coupling are arranged coaxially relative to one another and to the differential unit, both couplings can be actuated by one single actuator. To that extent, the disclosed drive assembly manages with relatively few components, which has an advantageous effect on the installation space and the production costs. However, in principle, it is also feasible that for the hang-on coupling there is provided a first actuator and for the locking coupling a separate second actuator.

A further advantage of the disclosed drive assembly is that the angle drive, by means of which torque is introduced from the propeller shaft into the differential assembly, is stationary when the hang-on coupling is open. In this way it is possible to reduce rotational friction losses of the bearings of the ring gear and of the driving pinion which bearings are normally pretensioned with high forces. In addition, it is possible to avoid splashing losses which are caused by the rotation of the ring gear around the rotational axis, which, in turn, advantageously affects the fuel consumption of the motor vehicle.

According to a exemplary first embodiment it is proposed that a locking coupling is provided in the form of a form-locking coupling. Form-locking couplings are meant to be couplings wherein the transmission of torque is effected by a form-locking engagement between a first coupling part and a second coupling part. As non-limiting examples, claw couplings, dog clutches or toothed couplings are named. By closing the locking coupling it is ensured that the two sideshaft gears and the carrier element of the differential unit rotate jointly as a block around the rotational axis, i.e. compensating movement between the sideshaft gears cannot take place any more. Said embodiment comprising a form-locking coupling represents a particularly compact solution for providing a differential lock, with the actuation mechanics for the hang-on coupling at the same time being used for actuating the locking coupling.

In another exemplary embodiment, the locking coupling comprises a first coupling part which is connected in a rotationally fixed way to a carrier element of the differential unit, as well as a second coupling part which is connected in a rotationally fixed way to a sideshaft of the differential unit, with there being provided at least one actuating lever to cause the first coupling part to engage the second coupling part for transmitting torque. In one exemplary arrangement, the at least one actuating lever is supported so as to be pivotable around a pivot axis, wherein a first end of the lever is effectively connected to the coupling parts of the locking coupling and a second end of the lever is effectively connected to one of the coupling parts of the locking coupling. In this way, the actuating lever acts as a seesaw, with an axial movement of an actuator component causing the locking coupling to be axially loaded. A particularly advantageous kind of force transmission is achieved if a first lever arm between the force application point of the actuating lever at the actuator and at the pivot bearing is smaller than a second lever arm between the force application point of the actuating lever at the coupling part and the pivot bearing. As a result of this embodiment, a shorter axial setting path of the movable component of the actuator is translated into a long axial setting path at the locking coupling, and it is particularly advantageous if the transmission ratio is approximately 3:1.

The actuator of the first embodiment is may be designed in such a way that, starting from a unactuated condition in which the hang-on coupling and the locking coupling are open, in a first actuating region, first the locking coupling is loaded and that, in a second actuating region, in addition to the locking coupling, the hang-on coupling is actuated, too. In this way, it is ensured that the form-locking locking coupling is securely closed before torque is transmitted to the axle. The actuator may comprise a ball ramp assembly which further comprises an axially supported supporting disc and a setting disc which is axially displaceable relative thereto, wherein by rotating the two discs relative to one another, the setting disc is axially displaceable. In this context, a relative rotation relative to one another means that either the supporting disc or the setting disc can be rotated relative to the respective other disc while the respective other disc is held in a rotationally fixed condition. More particularly, it is proposed that the two discs each comprise ball grooves whose depths vary around the circumference and in which there are accommodated balls, wherein the two discs are axially supported relative to one another via the balls. The ball grooves of the two discs may be designed in such a way that the hang-on coupling is actuated by relatively rotating the two discs into a first direction of rotation and that, the locking coupling, too, is actuated by relatively rotating the two discs in the opposed second direction of rotation.

In one exemplary embodiment, the setting disc, on its radial inside, comprises a form-engaging element which engages a driving element at the first end of the actuating lever, wherein, by axially displacing the setting disc, the actuating lever is pivoted around the pivot axis and wherein the coupling parts of the locking coupling are made to engage one another. More particularly, it is proposed that the first coupling part of the locking coupling is axially displaceable relative to the carrier element of the differential unit and that the second coupling part of the locking coupling is axially supported relative to the sideshaft. For example, the first coupling part can be provided in the form of a switching sleeve which, by means of shaft teeth is held on a sleeve projection of the carrier element in a rotationally fixed and axially displaceable way. The second coupling part can be provided in the form of a toothed shaft rim which, by means of shaft teeth, is connected to the sideshaft in a rotationally fixed way. For torque transmitting purposes, the switching muff and the shaft rim, at their end faces facing one another, can each be provided with a face toothing which can engage one another in a form-locking way. To achieve a compact design, it is advantageous if the locking coupling is arranged radially inside the actuator. In one exemplary arrangement, in order to ensure that the two coupling parts securely and form-lockingly engage one another, it is proposed that the at least one actuating lever is designed to be intrinsically elastically resilient. It could be any number of actuating levers, the number depending on the force to be transmitted. To achieve a uniform distribution of force around the circumference, a number of three actuating levers is advantageous.

In another embodiment, the ball grooves of at least one of the discs, in the first direction of rotation, starting from an end position in which the two discs approach one another, comprise a first portion with a first gradient and a second portion with a second gradient, wherein the gradient of the first portion is greater than the gradient of the second portion. When the respective disc is actuated, the actuator stroke initially takes place on the steep first portion in order to quickly close the coupling play and then it takes place on the flatter second portion, which allows an accurate adjustment of the torque to be transmitted. When actuation takes place in said first direction of rotation, the actuating lever is not moved, so that the locking coupling remains unactuated.

In the second direction of rotation, the ball grooves of said disc, starting from the end position, comprise a first portion with a first gradient, a second portion with a second gradient and a third portion with a third gradient, wherein the gradients of the first and of the second portion are each greater than the gradient of the third portion. This embodiment provides that the setting disc moves and axially displaces the actuating lever, so that the locking coupling is loaded. First, the first portion is passed, which first portion is short and steep in order to ensure that the actuating lever is gripped from behind. There then follows the second portion which is similarly steep like the first portion, as well as the third portion which is flatter than the first and the second portion. This embodiment advantageously provides that the form-locking locking coupling is securely closed prior to the hang-on coupling reaching its abutment point. There may also be provided transition portions between said portions.

According to another embodiment, it is proposed that the hang-on coupling is provided in the form of a friction plate coupling. This is advantageous in that the locking effect can be variably set as required by controlling the actuator. Accordingly, the friction plate coupling permits any desirable intermediate position between an open position in which no torque is transmitted between the coupling input part and the coupling output part, and a closed position in which the coupling parts are fully closed and jointly rotate around the rotational axis to be used. More particularly, a compact design of this exemplary embodiment is achieved in that the hang-on coupling and the locking coupling are coaxially arranged inside one another, with the hang-on coupling being effectively arranged between the input part of the drive assembly and a carrier element of the differential unit and with the locking coupling being effectively arranged between the carrier element and a sideshaft gear of the differential unit.

In both embodiments, the actuator may comprise a ball ramp assembly which further comprises an axially supported supporting disc, an axially displaceable first setting disc for loading the hang-on coupling as well as an axially displaceable second setting disc for loading the locking coupling. The two setting discs can be loaded by the supporting disc in the same axial direction. More particularly it is proposed that the second disc for actuating the locking coupling is arranged coaxially inside the first disc for actuating the hang-on coupling. At its end face facing the setting discs, the supporting disc comprises circumferentially distributed first ball grooves which are arranged opposite the ball grooves of the first setting disc, as well as circumferentially distributed second ball grooves which are arranged coaxially inside the first ball grooves and opposite the ball grooves of the second setting disc. In the first ball grooves of the supporting disc and in the opposed ball grooves of the first setting disc, there are arranged first balls via which the first setting disc is axially supported on the supporting disc. Accordingly, in the inner second ball grooves of the supporting disc and in the opposed ball groves of the second setting disc there are arranged second balls via which the second setting disc is axially supported on the supporting disc.

At least the ball grooves of the supporting disc may be designed in such a way that, starting from the unactuated condition in which the hang-on coupling and the locking coupling are open, in a first actuation circumference, first the hang-on coupling is loaded and, in a second actuation circumference, the locking coupling, too, is loaded in addition to the hang-on coupling. To put the proposed drive assembly into effect, it is proposed that the ball grooves are designed in such a way that, starting from an end position in which the discs are arranged close to one another, by rotating the supporting disc, first only the first setting disc is axially loaded for actuating the hang-on coupling. The torque to be transmitted can be set by controlling the setting angle in accordance with requirements. If the locking function is required, the supporting disc is further rotated, so that, in addition to the first setting disc, the second setting disc, too, is axially loaded for actuating the locking coupling. The hang-on coupling is fully closed. By compressing the locking coupling, the carrier element of the differential unit, also referred to as differential carrier or differential cage, is connected to a sideshaft gear in a friction-locking way. In this way, the compensating effect of the sideshaft gears is restricted, i.e. the differential unit is locked.

According to another exemplary embodiment, the first ball grooves of the supporting disc each comprise a first gradient portion within which the actuation of the hang-on coupling takes place. Said gradient portion is followed by a second portion without a gradient in which the balls run when the locking coupling is actuated. The ball grooves of the first setting disc preferably correspond to the first ball grooves of the supporting disc, i.e. they also comprise a portion with a gradient and a portion without a gradient. The second ball grooves of the supporting disc each comprise a first portion without a gradient which, more particularly, is positioned in the circumferential region of the gradient portions of the first ball grooves. These are followed by gradient portions by which the locking coupling is actuated. The ball grooves of the second setting disc may correspond to the second ball groove of the supporting disc.

According to another exemplary embodiment, in the case of which the hang-on coupling is also provided in the form of a friction coupling, the actuator is axially arranged between the hang-on coupling and the locking coupling. Said embodiment is similar to the second embodiment in that the actuator may also comprise a ball ramp assembly. There are achieved the same advantages of a compact design while comprising the possibility of variably setting the locking effect of the differential by the friction plate coupling.

The ball ramp assembly of this embodiment may also comprise an axially supported supporting disc, a first setting disc for the hang-on coupling, which first setting disc can be axially moved in a first direction, and a second setting disc for the locking coupling, which second setting disc can be moved in an opposed second direction. The supporting disc is axially arranged between the first setting disc and the second setting disc. In this case, too, it is proposed that the supporting disc and the two setting discs each comprise ball grooves with variable depths around the circumference in which there are received balls, with the two setting discs being axially supported via the balls relative to the supporting disc. The ball grooves are designed in such a way that, starting from an end position in which the discs are arranged close to one another, by rotating the supporting disc, initially only the first setting disc is axially loaded for actuating the hang-on coupling and that, by rotating the supporting disc further, in addition to the first setting disc, the second setting disc is also axially loaded for actuating the locking coupling. For this purpose, the first ball grooves of the supporting disc, which are positioned opposite the first setting disc, comprise a first portion with a gradient which is unequal to zero and a second portion with a constant groove depth, with the ball grooves of the first setting disc being of a corresponding design. Furthermore, the second ball grooves of the supporting disc, which are arranged opposite the second setting disc, comprise a first portion without a gradient and a second portion with a gradient.

According to another exemplary embodiment, which largely corresponds to the previously discussed embodiment, it is proposed that the ball grooves are designed in such a way that, by rotating the supporting disc into a first direction of rotation, the first setting disc is axially loaded for actuating the hang-on coupling, and that, by rotating the supporting disc in an opposed second direction of rotation, both the first setting disc for actuating the hang-on coupling and also the second setting disc for actuating the locking coupling are axially loaded. For this purpose, the ball grooves of the first setting disc may comprise a central portion with a greatest groove depth and, adjoining thereto in both circumferential directions, a first gradient portion and a second gradient portion. The second ball grooves of the supporting disc, which are arranged opposite the second setting disc, each comprise a first portion with a greatest groove depth without a gradient, a central second portion with a gradient and a third portion with a smaller groove depth without a gradient.

It applies to all the above-mentioned embodiments that the hang-on coupling may be provided in the form of a friction plate coupling, with an outer plate carrier of the hang-on coupling being connected in a rotationally fixed way to an input part of the drive assembly, with an inner plate carrier of the hang-on coupling being connected in a rotationally fixed way to a carrier element of the differential unit.

BRIEF DESCRIPTION OF THE DRAWINGS

Exemplary embodiments will be explained below with reference to the drawings wherein.

DETAILED DESCRIPTION

Figure 1:
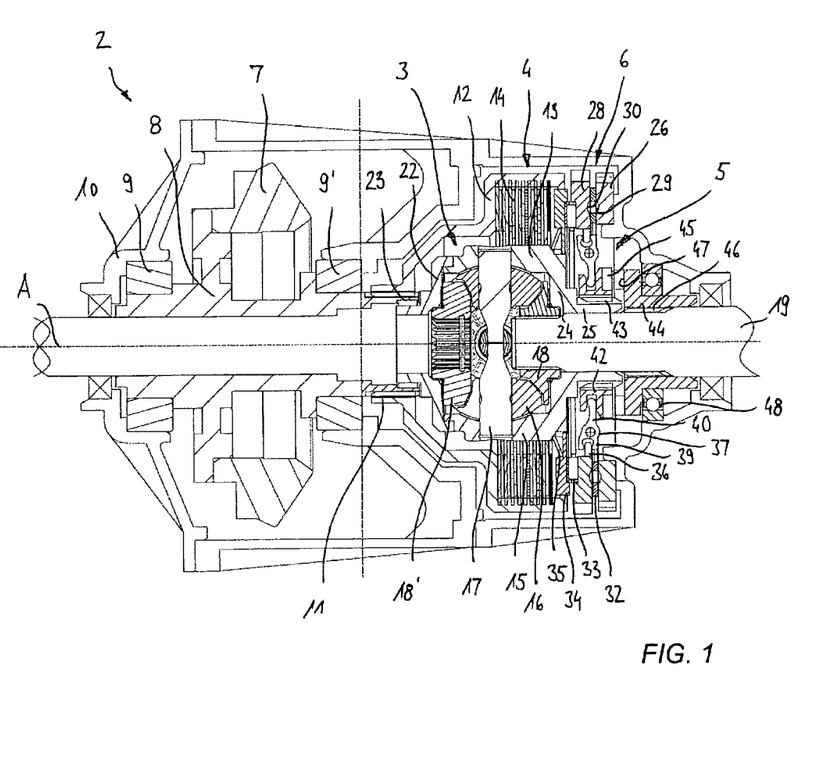
FIG. 1 is a longitudinal section through a first exemplary embodiment of a drive assembly.

FIG. 1 shows an exemplary drive assembly 2 in a first embodiment. The drive assembly 2 comprises a differential unit 3, a hang-on coupling 4 which, if required, is able to connect the drive axle positioned behind same in the torque flow, a locking coupling 5 for optionally blocking the compensating movement of the differential unit 3, as well as an actuator 6 which is able to actuate both the hang-on coupling 4 and the locking coupling 5.

The drive assembly comprises a ring gear 7 via which, by a pinion (not illustrated), torque can be introduced into the drive assembly 2. The ring gear 7 is firmly connected to a flange of a hollow shaft 8, and via bearing mechanisms 9, 9', is supported so as to be rotatable around a rotational axis A in the housing 10 of the drive assembly 2. At its end facing, the differential 3 and the hollow shaft 8 comprise splines 11 which, for torque transmitting purposes, are engaged by correspondingly designed splines of a first coupling part 12 of the hang-on coupling 4. The first coupling part 12 is provided in the form of a coupling carrier which is arranged coaxially relative to the axis of rotation A and inside which there is arranged the differential unit 3. It can be seen that the hang-on coupling 4 is provided in the form of a friction plate coupling which comprises an outer plate carrier to which outer plates are connected in an axially displaceable and rotationally fixed way, as well as an inner plate carrier to which inner plates are connected in a rotationally fixed and axially displaceable way. The outer plates and inner plates are arranged so as to axially alternate and jointly form the plate package 14 of the hang-on coupling 4. The inner plate carrier forms the second coupling part 13 of the hang-on coupling 4, which coupling part 13 can also be referred to as the coupling output part.

The second coupling part 13 is firmly connected to an input part 15 of the differential unit 3 and may be produced so as to be integral therewith. The input part 15 is provided in the form of a differential carrier 15 which is arranged so as to be rotatingly drivable around the axis of rotation A. In the differential carrier 15, differential gears 16 are supported so as to be rotatable on journals 17 and jointly rotate with the differential carrier 15 around the rotational axis A. The differential gears 16, 16' engage sideshaft gears 18, 18' which are arranged coaxially relative to the rotational axis A and which, via abutment discs, are axially supported relative to the differential carrier 15. The sideshaft gears 18, 18' each comprise a bore with splines into which, for torque transmitting purposes, there is inserted an associated sideshaft 19 of which, in the present embodiment, only the righthand sideshaft is shown. The differential carrier 15 comprises a first carrier part 22 which, via a bearing mechanism 23, is supported relative to the hollow shaft 8 so as to be rotatable around the rotational axis A, as well as a second carrier part 24 which is firmly connected thereto and which, at the opposite end, comprises a sleeve projection 25. The differential carrier 15 is rotatably supported on the sideshaft 19 by the sleeve projection 25.

The actuator 6 which, inter alia, serves to actuate the hang-on coupling 4, comprises a supporting disc 26 which is axially supported relative to the housing 10 of the drive assembly 2, as well as a setting disc 28 which is arranged opposite the supporting disc 26. In the opposed end faces of the supporting disc 26 and respectively, of the setting disc 28, there are circumferentially distributed ball grooves 29, 30 whose depth varies around the circumference and in each of which there is arranged a ball. The balls are received in pockets of a cage 32 arranged axially between the two discs 26, 28 and are thus held in their circumferential position. For actuating the ball ramp assembly, there is provided an electric motor which is able to rotate the setting disc 28 relative to the supporting disc 26.

When the electric motor (not illustrated) is actuated, the balls held in the ball grooves 29, 30 move into the regions of a lesser depth, which means that the setting disc 28 moves axially towards the hang-on coupling 4. The setting disc 28 is axially supported relative to a pressure plate 34 by an axial bearing 33. By rotating the setting disc 28, the pressure plate 34 moves towards the hang-on coupling 4, with the pressure plate 34 axially loading the plate package 12. In this way, torque is transmitted from the first coupling part 12 to the differential carrier 15. In the fully opened condition of the hang-on coupling 4, no torque at all is transmitted, so that the first coupling part 12, including the hollow shaft 8 and the ring gear 7, is stationary, whereas in the fully closed condition of the hang-on coupling 4 torque is transmitted from the ring gear 7 to the sideshafts 19, 19'. Between the pressure plate 34 and the second coupling part 24 there is arranged a returning spring 35 which, in the unactuated condition of the actuator 6, axially loads the pressure plate 34 towards the supporting disc 26.

In addition to actuating the hang-on coupling 4, the actuator 6 has a further function, i.e. the actuation of the locking coupling 5. In the present exemplary embodiment, the locking coupling 5 is provided in the form of a form-locking coupling, i.e. the transmission of torque takes place as a result of the form-locking engagement between the two coupling parts 42, 44. It can be seen that the setting disc 28, at its inner end, comprises a form-engagement mechanism 36 which cooperates with a plurality of circumferentially distributed actuating levers 37. The actuating levers 37 are supported so as to be pivotable around individual pivot axes S. The radially outer first end 39 of the actuating levers 37 is provided in the form of a yoke which embraces the form-engaging mechanism 36. The radially inner second end 40 of the actuating levers 37 each engages a radial recess 41 of the first coupling part 42.

This embodiment—when the setting disc 28 is moved axially—causes the actuating lever 37 to pivot, with the first coupling part 42 being moved towards the second coupling part 44. It can be seen that a first lever arm H1 between the force application point of the actuating lever 37 at the actuator 6 and the pivot bearing S is smaller than a second lever arm H2 between the force application point of the actuating lever 37 at the first coupling part 42 and the pivot bearing S. In this embodiment, a shorter axial setting path of the setting disc 28 of the actuator 6 is translated into a longer axial setting path at the locking coupling 5. The first coupling part 42 is provided in the form of a switching sleeve which, by longitudinal teeth 43, is arranged on the sleeve projection 25 of the differential carrier in a rotationally fixed way and is axially displaceable relative thereto. At its end facing the second coupling part 44, the first coupling part 42 comprises a face toothing 45 which is able to engage a correspondingly designed face toothing 47 of the second coupling part 44. The second coupling part 44 is provided in the form of a toothed shaft rim which, via longitudinal teeth 46, is connected to the sideshaft 19 in a rotationally fixed way. The second coupling part 44 and, respectively, the sideshaft 19 are supported via a rolling-contact bearing 48.

Figure 2:
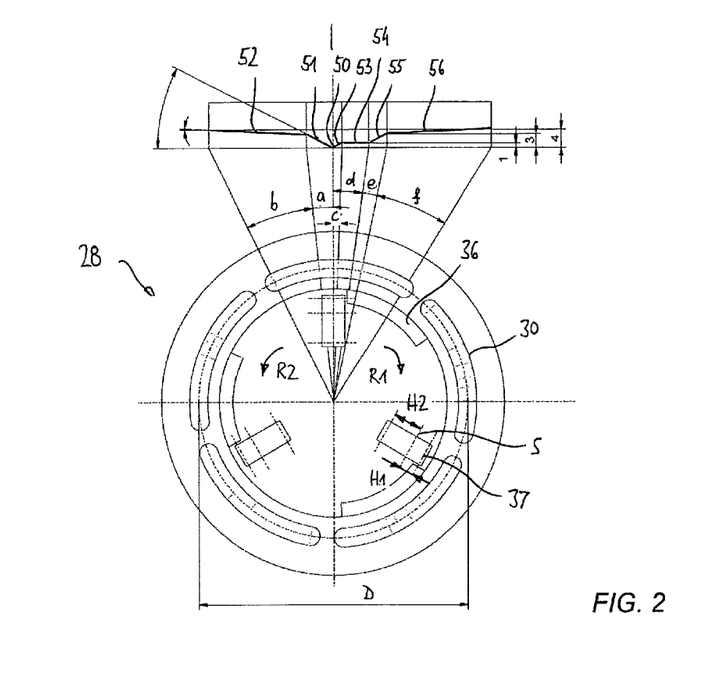
FIG. 2 shows a setting disc of the drive assembly of FIG. 1:
 a) in an axial view,
 b) and the groove profile of a ball groove around the circumference.

Below, with reference to FIG. 2, there will follow a description of the functioning mode of the actuator 6 which is may be provided in the form of a ball ramp assembly. There is shown the setting disc 28, with the supporting disc 26, with reference to the profile of the ball grooves, comprising a corresponding design. The ball ramp assembly and, respectively, the contours of the ball grooves of the setting disc 28 and of the supporting disc 26 are designed such that, starting from an end position in which the two discs 26, 28 approach one another, due to a relative rotation into a first rotational direction R1, only the hang-on coupling 4 is actuated and that, due to a relative rotation of the two discs 26, 28 in the opposed second rotational direction R2, the locking coupling 5, too, is actuated. For this purpose, the profile of the ball grooves 30, starting from a central portion 50 with a greatest groove depth, upon rotation in the first rotational direction R1, initially comprises a first portion 51 with a greater gradient as well as a circumferentially adjoining second portion 52 with a smaller gradient. It is proposed that the circumferential angle a of the first gradient portion 51 is smaller than the circumferential angle b of the second gradient portion 52. As a result of the profile defined in this way, upon rotation of the setting disc 28 in direction R1, there initially occurs a relatively fast axial movement of the setting disc 28 towards the plate package 14 when the balls move along the first gradient portion 51. However, in the second gradient portion 52, because of the smaller gradient, it is possible to effect a sensitive control of the degree of locking of the hang-on coupling 4.

If rotation occurs in the opposed second rotational direction R2, the profile of the ball grooves is such that, starting from the lowest point in the central portion 50, there is initially obtained a smaller, relatively steep first groove portion 53 with a circumferential extension c as well as a circumferentially adjoining second groove portion 54 with a greater circumferential extension d and a constant groove depth. When moving over said first and second groove portions 53, 54, it is first ensured that the actuating lever 37 is gripped from behind. The second groove portion 54 is followed by a third groove portion 55 with a circumferential extension e and a fourth groove portion 56, with the fourth groove portion 56 extending around a greater circumferential length f and comprising a smaller gradient than the third groove portion 55. The third groove portion 55 ensures the closing of the locking coupling 5, whereas in the circumferential region of the fourth groove portion 56, the hang-on coupling is actuated. The present profile of the ball grooves 30 in the second rotational direction R2 ensures that the form-locking locking coupling 5 is securely closed before the hang-on coupling 4 has reached its abutment point.

Figure 3:
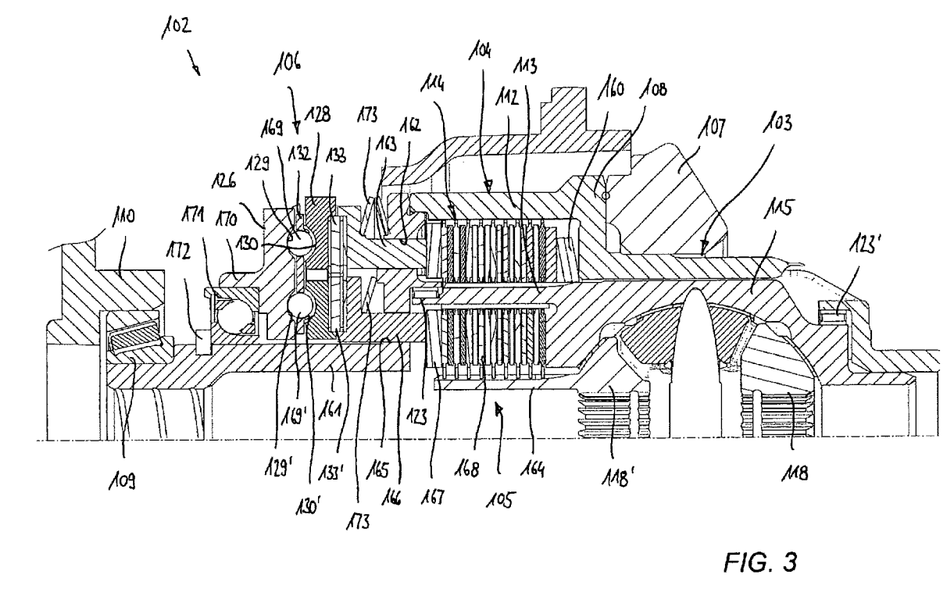
FIG. 3 is a longitudinal section through a second exemplary embodiment of a drive assembly.

FIG. 3 shows a drive assembly 102 accordingly to a second exemplary embodiment which largely corresponds to the embodiment according to FIG. 1, so that as far as the common features are concerned, reference is made to the above description. The reference numbers of identical parts or parts corresponding to one another have been increased by the FIG. 100. One characteristic of the present drive assembly includes that both the hang-on coupling 104 and the locking coupling 105 are provided in the form of friction plate couplings. The torque is introduced by a bevel gear (not illustrated) into the ring gear 107 which is firmly connected to the first coupling part 112, for example by welding. In the present embodiment, the first coupling part 112 is provided in the form of a coupling cage to which the outer plates of the plate package 114 are connected in a rotationally fixed and axially movable way. The second coupling part 113 which is coaxially positioned inside the first coupling part 112 is provided in the form of an inner plate carrier to which the inner plates of the plate package 114 are connected in a rotationally fixed and axially movable way. It can be seen that in the present embodiment, the differential unit 103 is arranged with an axial overlap, i.e. inside the ring gear 107. This achieves an axially compact assembly.

The plate package 114 of the hang-on coupling 104 is axially supported relative to the coupling cage by a spring mechanism 160 which may be provided in the form of plate springs. In addition to the outer plate carrier, the coupling cage 112 comprises a cover part 161, which cover part 161 is firmly connected to the outer plate carrier, for example by welding. The cover part 161 comprises a flange portion with a plurality of circumferentially distributed first apertures 162 through which first actuating punches 163 are guided, as well as second apertures 165 which are positioned radially inside the outer apertures 162, which are circumferentially distributed around the circumference and through which second actuating punches 166 are guided. The first actuating punches 163 serve to transmit force from the first setting disc to the plate package of the hang-on coupling 104, whereas the second actuating punches 166 serve to transmit force from the second setting disc to the plate package of the locking coupling 105.

The second coupling part 113 of the hang-on coupling 104 is firmly connected to the differential carrier 115 and may comprise a sleeve-shaped projection. For supporting the first coupling part 112 relative to the differential carrier 115, there are provided two bearing elements 123, 123' in the form of radial bearings. The locking coupling 105 is coaxially arranged inside the hang-on coupling 104 such that they at least partially axially overlap each other. The second coupling part 113 of the hang-on coupling 104 simultaneously forms the first coupling part 122 of the locking coupling 105. More particularly, an inner face of the sleeve-shaped projection is provided with a form-engaging mechanism in which the outer plates of the locking coupling 105 are held in a rotationally fixed and axially displaceable way. The inner plates, which are arranged so as to alternate with the outer plates, are connected to a sleeve projection 164 in a rotationally fixed and axially displaceable way, which sleeve projection 164, in turn, is firmly connected to a sideshaft gear 118 of the differential unit 103.

The actuator 106 is provided in the form of a ball ramp assembly. However, in contrast to the above-mentioned embodiment, the ball ramp assembly comprises a supporting disc 126 and two setting discs 128, 128' which are arranged opposite the supporting disc 126 and coaxially relative to the rotational axis A. The first setting disc 128 which serves to actuate the hang-on coupling 104 is positioned coaxially outside the second setting disc 128' which serves to actuate the locking coupling 105. Both setting discs 128, 128' are annular in shape and are axially supported via an axial bearing 133, 133' relative to the associated actuating punches 163, 166. The supporting disc 126 comprises outer first ball grooves 129 which are arranged opposite the ball grooves 130 of the first setting disc 128, as well as radially inner second ball grooves 129' which are arranged axially opposite the ball grooves 130' of the second setting disc 128'. The first balls 169 associated with the first setting disc 128 and the second balls 169' associated with the second setting disc 128' are held in a common ball cage 132. The supporting disc 126 is annular in shape and, on its reverse side, comprises a sleeve-shaped projection 170 which receives the outer race of a rolling contact bearing 171 by which the supporting disc 126 is rotatably supported relative to the cover part 161. The rolling-contact bearing 171 is axially supported relative to the cover part 161.

A first spring mechanism 173 is effectively arranged between the first actuating punch 163 and the cover part 161 which spring mechanism 173, in the unactuated condition of the actuator 106, returns the actuating punch 163, i.e. axially load same away from the hang-on coupling 104. Accordingly, between the second actuating punches 166 and the cover 161, there are effectively arranged a second spring mechansim 173' which axially loads the second actuating punches 166 towards the ball ramp assembly 106. In the present embodiment the first and the second spring mechanisms 173, 173' are provided in the form of plate springs, but it is also possible to use helical springs or the like.

A special feature of the present exemplary embodiment includes that, in contrast to the first embodiment, the locking value of the locking coupling 105 can be variably set by the motor position of the actuator 106. As in the case of the previous embodiments, for operating the actuator 106, there is provided a motor which generates the axial force for compressing the plate package 114 of the hang-on coupling 104 and also of the plate package 168 of the locking coupling 105. For operating purposes, there is provided a plurality of circumferentially distributed first ball grooves 129 as well as second ball grooves 129' arranged concentrically relative thereto with different gradients and different angular positions. The first setting disc 128 for actuating the hang-on coupling 104 corresponds to the first ball grooves 129 of the supporting disc 126 and the second setting disc 128' for actuating the locking coupling 105 corresponds to the second ball grooves 129' of the supporting disc 126.

Figure 4:
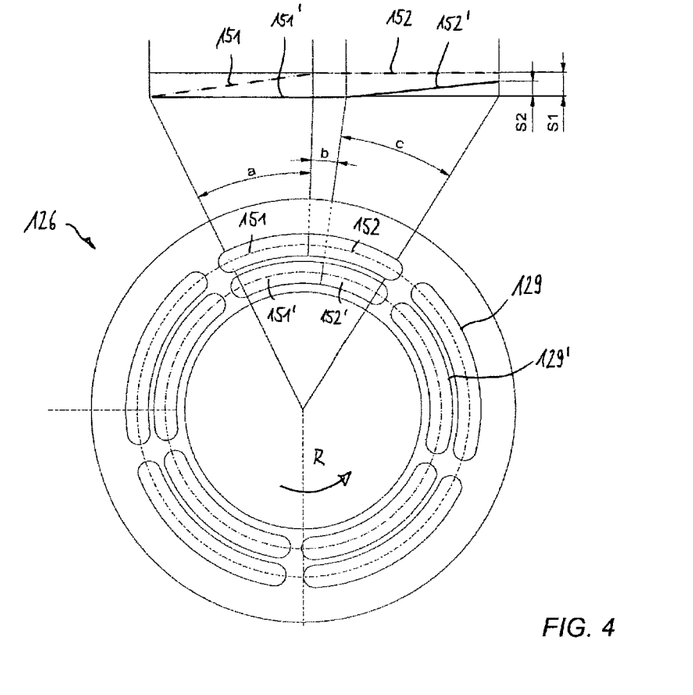
FIG. 4 shows a supporting disc of the drive assembly according to FIG. 2:
 a) in an axial view,
 b) and a groove profile of a first and of a second ball groove around the circumference.

Below, there will follow a detailed description of the mode of functioning of the ball ramp assembly 106. FIG. 4 shows an axial view of the supporting disc 126 of the ball ramp assembly 106. It is possible to see the radially outer first ball grooves 129 and the radially inner second ball grooves 129'. FIG. 4b shows the profiles of the first ball grooves 129 in dashed lines and the second ball grooves 129' in continuous lines around the circumference. The ball grooves 129, 129' of the supporting disc 126 and the ball grooves 130, 130' of the two setting discs 128, 128', respectively, are designed such that, starting from the actuated condition, in which the hang-on coupling 104 and the locking coupling 105 are open, in a first actuation region, initially only the hang-on coupling 104 is loaded and in the following second actuation region, in addition to the hang-on coupling 104, the locking coupling 105 is also loaded.

For this purpose, the first ball grooves 129 of the supporting disc 126 and the ball grooves 130 of the first setting disc 128 comprise a first groove portion 151 with a circumferential extension a and with a gradient unequal to zero, which is followed by a second groove portion 152 with a greater circumferential extension b+c and a constant groove depth. The second ball grooves 129' of the supporting disc 126 and the ball grooves 130' of the second setting disc 128' comprise a first groove portion 151' with a circumferential extension a+b with a constant groove depth and an adjoining groove portion 152' with a shorter circumferential extension c with a gradient unequal to zero. The gradient of the second groove portion 152' of the second ball grooves 129' is smaller than the gradient of the first groove portion 151 of the first ball grooves 129. The planar groove portion 151' of the second ball grooves 129' and the planar groove portion 152 of the first ball grooves 129 comprise a certain overlapping region b. There is thus provided a neutral setting region in order to avoid the influence of tolerances.

If the supporting disc 126 is rotated in the direction of the arrow, i.e. anti-clockwise, the gradient of the first groove portions 151 of the ball grooves 129 initially causes the hang-on coupling 104 to be compressed. By controlling the motor position, the effective coupling moment can be varied as required. If the locking function is required, the actuator 106 has to be rotated further so that the subsequent second groove portion 152' of the supporting disc 126 can act on the locking coupling 105 via the second setting disc 128'. The hang-on coupling 104 is now fully closed. By compressing the locking coupling 105, the differential carrier 115 is connected to the sideshaft gear 118' in a friction-locking way, so that the compensating movement between the two sideshaft gears 118, 118' is reduced. The compression of the plate package 168 of the locking coupling 105 can be set so as to be variable, so that the torque to be transmitted between an open position and a fully closed position can also be variably set.

To ensure that the driving moment of the motor is not exhausted and that the maximum coupling moment of the hang-on coupling 104 does not exceed a maximum to be defined, the balls of the first ball grooves 129—prior to the locking coupling 105 being started—run into the second groove portions 152 where the gradient angle is 0°. The maximum coupling moment of the hang-on coupling 104 is defined by the stiffness of the spring mechanism 160.

For certain driving-dynamic requirements it is also conceivable to provide an embodiment wherein, in a first direction of rotation of the motor and of the supporting disc 126 respectively, initially the locking coupling 105 abuts a plate spring assembly and thus sets a defined constant locking value for the differential unit 103. By rotating the supporting disc 126 further, it would then be possible to close the hang-on coupling 104, with a variable coupling moment being settable as required. Furthermore, the ball grooves would be designed in such a way that by rotating the supporting disc 126 in an opposed second direction of rotation, only the first setting disc 128 would be loaded for actuating the hang-on coupling 104.

Figure 5:
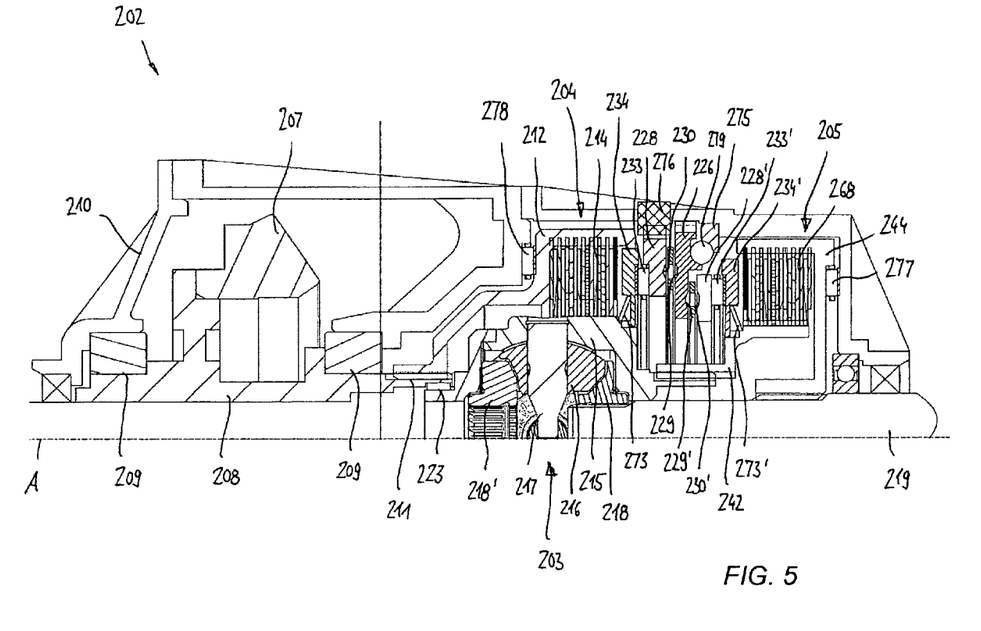
FIG. 5 shows an exemplary third embodiment of a drive assembly.

FIG. 5 shows another alternative embodiment of a drive assembly 202 which largely corresponds to that of FIG. 1. To that extent, as far as the common features are concerned, reference is made to the above description, with the reference number of identical parts or parts corresponding to one another having been increased by the figure 200. A special feature of the present exemplary embodiment is that the locking coupling 205 is provided in the form of a friction plate coupling, with the two friction plate couplings comprising approximately the same friction radius. In this embodiment, due to the relatively large friction radius of the locking coupling 205, it is possible to achieve also high locking moments. The actuator 206 which, in the present embodiment, may also be provided in the form of a ball ramp assembly as shown, is axially arranged between the hang-on coupling 204 and the locking coupling 205. The ball ramp assembly 206 comprises a supporting disc 226 which is rotatingly drivable and is axially supported at the housing 210 via a supporting bearing 275. Furthermore, the ball ramp assembly 206 comprises a first setting disc 228 which serves to actuate the hang-on coupling 204, and a second setting disc 228' which is arranged on the opposite side and serves to actuate the locking coupling 205. In the end faces of the supporting discs 226 and 228, which end faces face one another, there are arranged first ball tracks 229 and 230 respectively in which balls are held (not illustrated).

By rotating the supporting disc 226, the balls in the ball grooves run in regions with a lesser depth, so that the first setting disc 228 is axially moved towards the hang-on coupling 204 and loads the plate package 214 via an axial bearing 233 and a pressure plate 234. It can be seen that the first setting disc 228 is held in a rotationally fixed way by an anti-rotation mechanism 276 relative to the housing 210. Analogously, the locking coupling 205 is also actuated; upon rotation of the supporting disc 226, the second setting disc 228' moves towards the locking coupling 205, with force being transmitted from the second setting disc 228' via an axial bearing 233' and a pressure plate 234' to the plate package 268. The second setting disc 228' is also secured against rotation, which, however, is not shown here. For returning the first pressure plate 234 and the second pressure plate 234' respectively, there is provided spring mechanisms 273, 273' in the form of plate springs. The locking coupling 205 comprises a first coupling part 242 which is connected to the differential carrier 215 in a rotationally fixed way, as well as a second coupling part 244 which is connected to the sideshaft 219 in a rotationally fixed way. The first coupling part 242 comprises an inner plate carrier to which inner plates are connected in a rotational fixed and axially displaceable way. The second coupling part 244 comprises an outer plate carrier to which outer plates are connected in a rotationally fixed and axially displaceable way.

The second coupling part 244 is axially supported via an axial bearing 277 relative to the housing 210. The first coupling part 212 of the hang-on coupling 204 is also supported via an axial bearing 278 relative to the housing 210. This embodiment ensures that, depending on the arrangement of the ball tracks, the axial forces between the hang-on coupling 204 and the supporting bearing 275 can partially be compensated relative to one another. When the locking coupling 205 is closed, a reaction force acts on the supporting disc 226 by the amount of which the axial force at the supporting bearing 275 is reduced. By compressing the locking coupling 205, the outer plate carrier is connected to the inner plate carrier in a friction-locking way, which leads to a reduction in the compensating effect between the sideshaft gears 218, 218' of the differential unit 203.

As in the case of the embodiment according to FIG. 3, the present embodiment comprises only one single supporting disc 226 which can also be referred to as an input disc. As mentioned above, the supporting disc 226, at its first end face, comprises first ball tracks 229, and, at its second end face facing in the opposite direction, it comprises second ball tracks 229'. The ball grooves 229, 229' of the supporting disc 226 and those of the two setting discs 228, 228' are designed in such a way that, starting from an end position in which the discs approach one another, by rotating the supporting disc 226, initially only the first setting disc 228 is axially loaded for actuating the hang-on coupling 204 and that, by rotating the supporting disc 226 further, in addition to the first setting disc 228, the second setting disc 228' is also axially loaded for actuating the locking coupling 205. For this purpose, the profile of the ball grooves is similar to that in the embodiment according to FIG. 3 and will be explained below with reference to FIG. 6.

Figure 6:
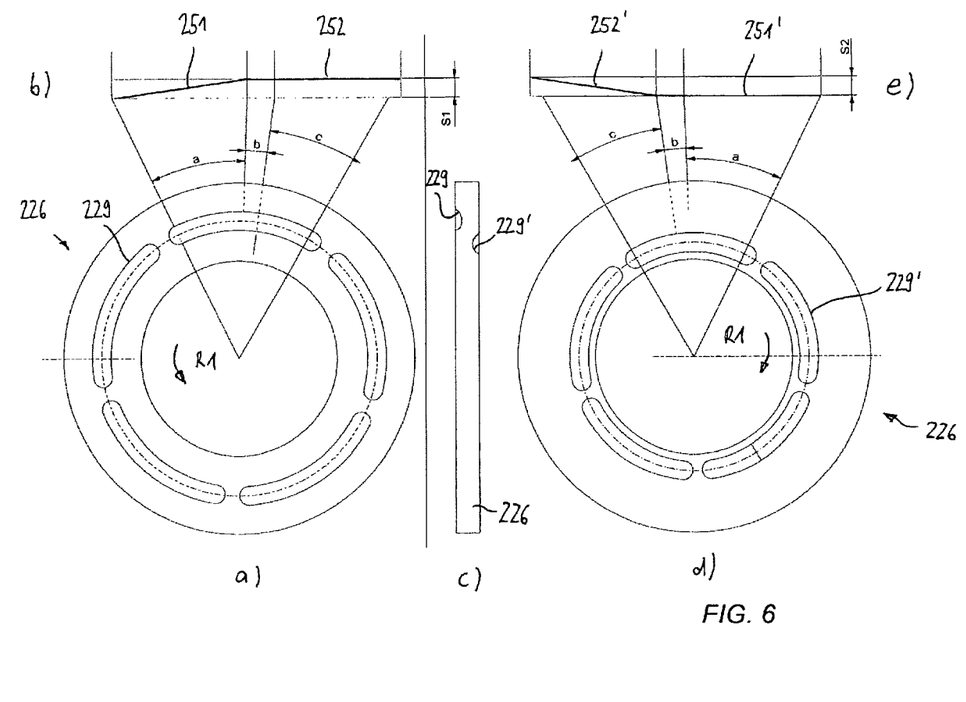
FIG. 6 shows a supporting disc of the drive assembly according to FIG. 5:
 a) in an axial view of a first end face,
 b) and a groove profile of a first ball groove around the circumference, c) a schematic in a longitudinal section,
d) an axial view of a second end face,
e) and a groove profile of a second ball groove around the circumference.

If the supporting disc 226 is rotated in direction R1 as shown in the drawing, the balls move along the first groove portion 251 around a circumferential extension a in regions of a smaller groove depth, so that the setting disc 228 is moved away from the supporting disc 226. This leads to the plate package 214 of the hang-on coupling 204 being loaded and, thus, the drive assembly is drivingly connected to the propeller shaft. The balls move in the second ball groove 229' along the planar groove portion 251' across an angular range a, i.e. the locking coupling 205 remains unactuated. By controlling the motor moment of the motor of the actuator, the effective coupling moment of the hang-on coupling 204 can be varied in accordance with requirements, i.e. between a position in which the hang-on coupling 204 is fully open and a position in which the hang-on coupling 204 is fully closed.

If the locking function is required, the supporting disc 226 is rotated further beyond the angular range b in direction R1, so that the balls run in the second ball grooves 229 along the groove portion 252' into regions of a lesser depth. In this way, the second setting disc 228' is moved towards the plate package 268 of the locking coupling 205, so that the latter is closed. The balls of the first ball grooves 229 run along the first groove portions 252 across the angle of rotation c, i.e. the hang-on coupling 204 remains locked. In this case, too, by correspondingly controlling the angle of rotation of the supporting disc 226 within the angle portion c, the locking moment of the locking coupling 205 can be set in accordance with requirements, with the hang-on coupling 204 always being fully closed.

Figure 7:
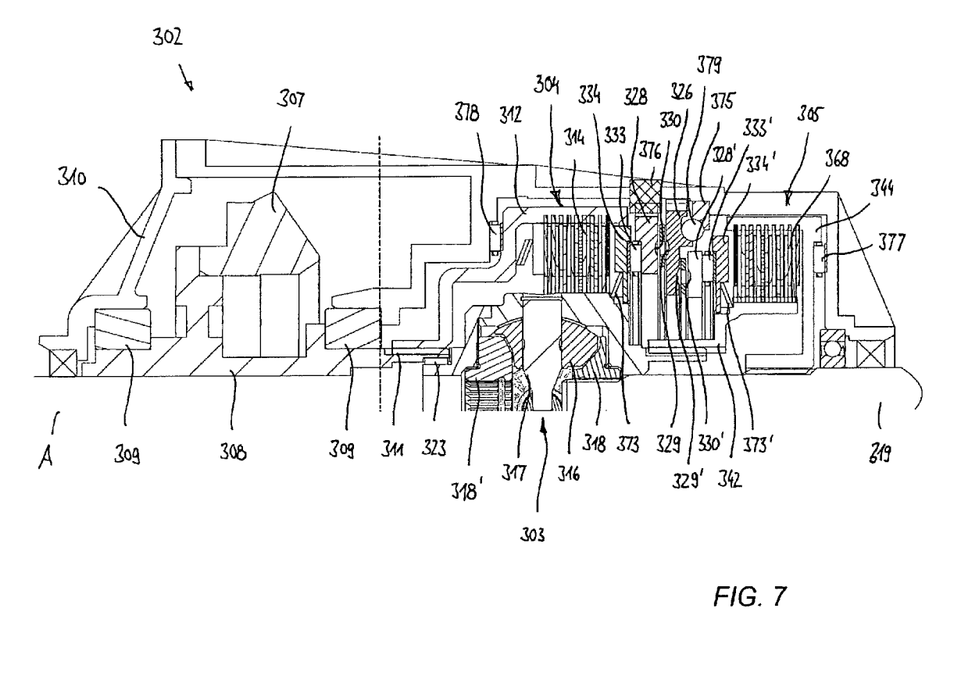
FIG. 7 shows an exemplary fourth embodiment of a drive assembly.

FIG. 7 shows a further embodiment of a drive assembly 302 which largely corresponds to that shown in FIG. 5. To that extent, as far as the common features are concerned, reference is made to the above description, with the reference numbers of identical parts or parts corresponding to one another having been further increased by the figure 100.

A special feature of the present exemplary embodiment includes that the ball grooves of the supporting disc 326 and those of the two setting discs 328, 328' are designed in such a way that, starting from an end position in which the discs approach one another, by rotating the supporting disc 326 in a first direction of rotation R1, only the first setting disc 328 is axially loaded for actuating the hang-on coupling 304 and that, by rotating the supporting disc 326 in a second opposed direction of rotation R2, in addition to the first setting disc 328, the second setting disc 328' is also axially loaded for actuating the locking coupling 305.

Figure 8:
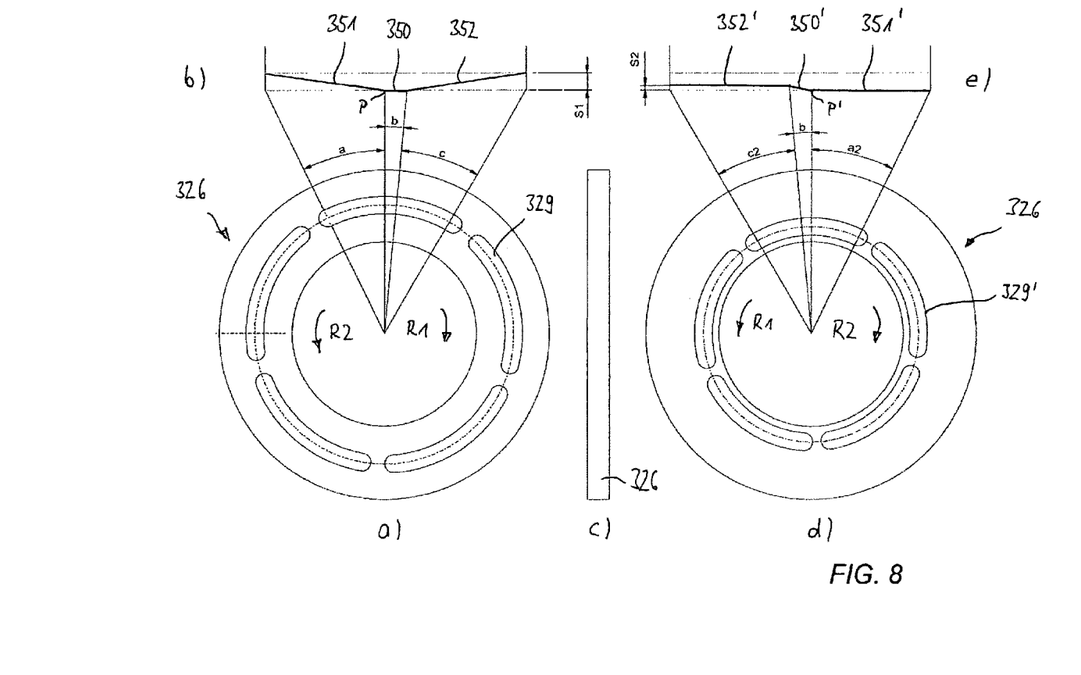
FIG. 8 shows a supporting disc of the drive assembly according to FIG. 7:
a) in an axial view of a first end face,
b) a groove profile of a first ball groove around the circumference,
c) a schematic in a longitudinal section,
d) an axial view of a second end face,
e) and a groove profile of a second ball groove around the circumference.

An exemplary profile of the ball grooves 329, 329' for this embodiment will be explained below with reference to FIG. 8.

It shows the supporting disc 326 wherein, in FIG. 8a one can see the first end face facing the hang-on coupling 304, and in FIG. 8d one can see the second end face facing the locking coupling 305. Starting from a central portion 350 wherein the balls are located in the regions of a greatest groove depth (point P), the balls, when the supporting disc 326 is rotated in a first direction of rotation R1, run along the first groove portion 351 between the supporting disc 326 and the first setting disc 328 in regions of a lesser depth, with the balls which are held between the supporting disc 326 and the second setting disc 328', starting from point P', running along the first groove portion 351'which has a constant depth. In this way, only the hang-on coupling 304 is actuated, with the torque to be transferred being settable so as to be variable, whereas the locking coupling 305 remains fully open, i.e. the differential unit 303 operates as an open differential.

By rotating the supporting disc 326 in a second direction of rotation R2 which is opposed to the first direction of rotation R1, the balls which are held between the supporting disc 326 and the first setting disc 328 initially move in the planar central portion 350 along an angle region b. Accordingly, the balls which are held between the supporting disc 326 and the second setting disc 328' move in the ball grooves 329' along the groove portion 350 inside the angle region b in regions of a lesser depth, so that initially, the locking coupling 305 makes only a gentle start, with the supporting disc 326 being lifted off the ball bearing 375. Inside said angle region b, there are arranged the balls for actuating the hang-on coupling 304 within the planar portion 350, so that the hang-on coupling 304 remains unactuated.

When the supporting disc 326 is rotated further in direction R2, the balls move in the first ball grooves 329 along the second groove portions 352 inside the angle region c in regions of a lesser depth, so that, in this way, the hang-on coupling 304 is actuated in addition to the locking coupling 305. In parallel thereto, the balls for the locking coupling 305 run along the third groove portions 352' which have a constant depth and extend over an angular region c2, i.e. when the ball ramp assembly in operated such that the balls run in the ball grooves 329, 329' inside the angular ranges c and c2, the hang-on coupling 304 is variably controllable between the open position and a closed position, so that, accordingly, torque can be transmitted to the rear axle according to the requirement.

The present exemplary embodiment constitutes a drive assembly which, initially, makes it possible to close the locking coupling 305 against the force of the spring mechanism. By rotating the supporting disc 326 further, it is possible, via the ball portions 352 with a gradient, which are associated with the hang-on coupling 304 only, to initiate the compression of the hang-on coupling 304. Thereby, the coupling moment of the hang-on coupling 304 being proportional to the coupling moment of the locking coupling. In this way it is possible to relieve the load on the supporting bearing 375 because the actuating forces act proportionately on both couplings 304, 305.

All the above-mentioned embodiments are advantageous in that the drive assembly permits a function both for locking the differential unit and a connecting function for connecting the drive axle to a main driveline, with only one single actuator being required. By selecting the suitable gradients and angular positions of the discs of the ball ramp assemblies, it is possible to put into effect different switching sequences. By arranging the ball ramp assemblies at and coaxially to the differential carrier it is possible to advantageously combine the disconnection of the angle drive for increasing the energy efficiency with a locking function in a compact and cost-effective form.

What is claimed is:

1. A drive assembly for a multi-axle driven motor vehicle, comprising:
    a differential unit with a rotational axis, an input part, and two output parts drivingly connected to the input part, wherein the two output parts have a differential effect relative to one another;
    an externally controllable hang-on coupling for drivingly connecting the differential unit to a driveshaft;
    an externally controllable locking coupling for locking a differential movement between the two output parts of the differential unit;
    wherein the hang-on coupling and the locking coupling are arranged coaxially relative to the axis of rotation.

2. A drive assembly according to claim 1, wherein there is provided at least one actuator for actuating the hang-on coupling and for actuating the locking coupling.

3. A drive assembly according to claim 2, wherein the hang-on coupling is provided in the form of a friction plate coupling.

4. A drive assembly according to claim 2, wherein the locking coupling is provided in the form of one of a dog clutch and a toothed coupling.

5. A drive assembly according to claim 4, wherein the locking coupling is arranged radially inside the at least one actuator.

6. A drive assembly according to claim 4, wherein the locking coupling comprises a first coupling part which is connected in a rotationally fixed way to the input part of the differential unit, and a second coupling part which is connected in a rotationally fixed way to a sideshaft of the differential unit, wherein there is provided at least one actuating lever for making the first coupling part engage the second coupling part for torque transmitting purposes.

7. A drive assembly according to claim 6, wherein the at least one actuating lever is pivotable around a pivot axis and, with a first end, is operatively connected to the actuator and, with a second end, is operatively connected to one of the coupling parts of the locking coupling.

8. A drive assembly according to claim 7, wherein a first lever arm between a force application point of the actuating lever at the at least one actuator and at the pivot axis is smaller than a second lever arm between a force application point of the actuating lever at the coupling part and at the pivot axis.

9. A drive assembly according to claim 4, wherein the at least one actuator comprises a ball ramp assembly which comprises an axially supported supporting disc and at least one setting disc which is axially displaceable relative thereto, wherein the supporting disc and the at least one setting disc each comprise ball grooves whose depth varies around the circumference and in which there are received balls, wherein the at least one setting disc is axially supported via the balls relative to the at least one supporting disc.

10. A drive assembly according to claim 9, wherein the setting disc radially inside comprises a form-engaging element which engages a driving element at the first end of the actuating lever, wherein, by axially displacing the setting disc, the actuating lever is pivoted around the pivot axis and the coupling parts of the locking coupling are made to engage one another.

11. A drive assembly according to claim 9, wherein the ball grooves of the supporting disc and of the at least one setting disc are designed in such a way that the locking coupling is actuated by rotating the two discs into a first relative direction of rotation and that by rotating the two discs in an opposed second relative direction of rotation the locking coupling and the hang-on coupling are actuated.

12. A drive assembly according to claim 11, wherein the ball grooves in the first relative direction of rotation, starting from an end position in which the two discs are arranged close to one another, comprise a first portion with a first gradient and a second portion with a second gradient, wherein the gradient of the first portion is greater than the gradient of the second portion.

13. A drive assembly according to claim 11, wherein the ball grooves in the second relative direction of rotation, starting from an end position in which the two discs are arranged close to one another, comprise a first portion with a first gradient, a second portion with a second gradient and a third portion with a third gradient, wherein the gradients of the first and of the second portion are each greater than the gradient of the third portion.

14. A drive assembly according to claim 2, wherein the hang-on coupling is provided in the form of a multi-plate friction coupling, wherein an outer plate carrier of the hang-on coupling is connected in a rotationally fixed way to an input part of the drive assembly and wherein an inner plate carrier of the hang-on coupling is connected in a rotationally fixed way to the input part of the differential unit.

15. A drive assembly according to claim 14, wherein the locking coupling is arranged coaxially inside the hang-on coupling.

16. A drive assembly according to claim 14, wherein the at least one actuator comprises a ball ramp assembly which comprises an axially displaceable first setting disc for acting upon the hang-on coupling and an axially displaceable second setting disc for acting upon the locking coupling, wherein the first and the second setting disc can be axially loaded in the same direction.

17. A drive assembly according to claim 16, wherein the supporting disc and the two setting discs are designed in such a way that, starting from an end position in which the discs are arranged close to another, by rotating the supporting disc, initially only the first setting disc is axially loaded for actuating the hang-on coupling and that, by rotating the supporting disc further, additionally also the second setting disc is axially loaded for actuating the locking coupling.

18. A drive assembly according to claim 17, wherein the first ball grooves of the supporting disc comprise a first portion with a first gradient and a second portion without a gradient and that the second ball grooves of the supporting disc comprise a first portion without a gradient and a second portion with a gradient.

19. A drive assembly according to claim 16, wherein the second setting disc for actuating the locking coupling is arranged coaxially inside the first setting disc for actuating the hang-on coupling.

20. A drive assembly according to claim 2, wherein the at least one actuator is arranged axially between the hang-on coupling and the locking coupling.

21. A drive assembly according to claim 20, wherein the at least one actuator comprises a ball ramp assembly with a first setting disc which, for actuating the hang-on coupling, is axially displaceable into a first direction, and with a second setting disc which, for actuating the locking coupling, is axially displaceable into an opposed second direction, and with a supporting disc which is arranged axially between the first setting disc and the second setting disc.

22. A drive assembly according to claim 21, wherein the supporting disc and the two setting discs are designed such that, starting from an end position in which the discs are arranged close to one another, by rotating the supporting disc, initially only the first setting disc for actuating the hang-on coupling is axially loaded and that, by rotating the supporting disc further, in addition to the first setting disc, the second setting disc for actuating the locking coupling is also axially loaded.

23. A drive assembly according to claim 21, wherein first ball grooves of the supporting disc, which are arranged opposite the first setting disc, comprise a first portion with a gradient and a second portion without a gradient.

24. A drive assembly according to claim 21, wherein second ball grooves of the supporting disc, which are arranged opposite the second setting disc, comprise a first portion without a gradient and a second portion with a gradient.

25. A drive assembly according to claim 21, wherein the supporting disc and the two setting discs are designed in such a way that, by rotating the supporting disc into a first direction of rotation, the first setting disc is axially loaded for actuating the hang-on coupling and that, by rotating the supporting disc into an opposed direction of rotation, the first setting disc for actuating the hang-on coupling and, additionally, the second setting disc for actuating the locking coupling are axially loaded.

26. A drive assembly according to claim 25, wherein the ball grooves of the supporting disc, which are arranged opposite the first setting disc, each comprise a central portion with a greatest groove depth and, adjoining said central portion in both circumferential directions, a first gradient portion and a second gradient portion.

27. A drive assembly according claim 25, wherein the ball grooves of the supporting disc, which are arranged opposite the second setting disc, each comprise a first portion with a greatest depth without a gradient, a central second portion with a gradient and a third portion with a smaller groove depth without a gradient.

28. A drive assembly according to claim 1, wherein the hang-on coupling is effectively arranged between an input part of the drive assembly and the input part of the differential unit, and the locking coupling is effectively arranged between the input part of the differential unit and one of the output parts of the differential unit.

* * * * *

UNITED STATES PATENT AND TRADEMARK OFFICE
CERTIFICATE OF CORRECTION

PATENT NO. : 8,678,971 B2  Page 1 of 1
APPLICATION NO. : 13/140670
DATED : March 25, 2014
INVENTOR(S) : Mark Schmidt et al.

It is certified that error appears in the above-identified patent and that said Letters Patent is hereby corrected as shown below:

In the Claims

Column 18 in claim 27, line 31, replace "A drive assembly according claim 25" with -- A drive assembly according to claim 25 --.

Signed and Sealed this
Second Day of September, 2014

Michelle K. Lee
*Deputy Director of the United States Patent and Trademark Office*